UNITED STATES PATENT OFFICE.

ALBERT F. ANDREWS, OF NEW HAVEN, CONNECTICUT, ASSIGNOR TO ALFRED EDWARDS AND ALBERT F. ANDREWS, OF SAME PLACE.

IMPROVEMENT IN FERTILIZERS.

Specification forming part of Letters Patent No. 141,848, dated August 19, 1873; application filed March 19, 1873.

*To all whom it may concern:*

Be it known that I, ALBERT F. ANDREWS, of New Haven, New Haven county, in the State of Connecticut, have invented certain new and useful Improvements in the Manufacture of Fertilizers, of which the following is a specification:

My invention may apply to the utilizing of blood, fish, and animal matter of all kinds; but I have experimented mainly with what is known as tank-stuff—the refuse from the rendering of lard and tallow.

Many efforts have been made to reduce offensive fertilizing material to a dry powder, but so far all are more or less open to objection. The present invention overcomes much of the difficulties heretofore experienced.

I employ pulverized unslaked lime, and incorporate it thoroughly with the material. It is important that the lime be of a character which shall slake with proper freedom. I have succeeded with what is known in this locality as "Bald Mountain" lime, which is a very slow slaking lime. I would prefer a kind which would slake a little faster.

In order to carry out the invention in the best manner I mix the finely-ground lime, by means of a machine, in the proportion of about one of the lime to three of the tank-stuff, applying heat externally to the vessel, or by other convenient means, to heat the mass. I realize a rapid and very economical drying effect. Twenty-eight pounds of lime absorb nine pounds of water, and is still left dry, while the heat generated by the slaking process drives off a large quantity of additional water.

The ammonia liberated by the process is conducted through suitable pipes, and condensed in water or recovered with the aid of acids, in the ordinary manner. Ammonia, if allowed to escape, is much less offensive to the neighborhood than the odors escaping in the ordinary drying processes. A liberal incorporation of salt into the material before the addition of the lime tends to prevent the disengagement of ammonia.

Chloride of calcium may be introduced either alone or in connection with salt. Where dirty salt is available from fish business or other sources, I would use half as much salt as lime.

I prefer for the mechanical agitation a machine recently invented by A. Edwards, of New Haven; but any efficient mixer driven by power will serve. It is well to stop the mixer and to allow the material to stand a few minutes after it has been well mixed, and then resume the agitation again. The artificial heat applied may be 300° Fahrenheit.

The treated material is reduced to a dry condition, suitable for packing and transportation, in a very brief period.

Some of the details may be varied without entirely defeating the objects of the invention. Thus a greater or lesser proportion of lime may be used, with a proportionate change in the time required. The artificial heat may be dispensed with altogether by the use of a greater quantity of lime and allowing a longer time. The final utilization of the ammonia may in some situations be dispensed with.

I claim as my invention—

1. The within-described treatment of tank-stuff and analogous matter with unslaked lime, and agitation in a power mixer, substantially as herein set forth.

2. The utilization of animal fertilizers by treating with artificial heat, in connection with a liberal quantity of unslaked lime, and agitation in a power mixer, as specified.

3. The treatment of animal fertilizers with chloride of sodium or chloride of calcium, in connection with unslaked lime and heat, with agitation, as herein specified.

In testimony whereof I have hereunto set my hand this 18th day of March, 1873, in the presence of two subscribing witnesses.

ALBERT F. ANDREWS.

Witnesses:
WM. C. DEY,
CHAUNCEY C. EDSON.